United States Patent [19]

Kumazawa

[11] 4,247,050
[45] Jan. 27, 1981

[54] FLUID REFLECTING MEMBER FOR USE IN A FLUID DISPERSING NOZZLE UNIT

[75] Inventor: Toshiharu Kumazawa, Fujisawa, Japan

[73] Assignee: Mitsubishi Precision Co., Ltd., Kamakura, Japan

[21] Appl. No.: 26,942

[22] Filed: Apr. 4, 1979

[30] Foreign Application Priority Data

Jul. 3, 1978 [JP] Japan .................................. 53-79744

[51] Int. Cl.³ .............................................. B05B 1/26
[52] U.S. Cl. ..................................... 239/498; 239/515
[58] Field of Search ................ 239/102, 498, 499, 514, 239/515

[56] References Cited

U.S. PATENT DOCUMENTS

| | | | |
|---|---|---|---|
| 2,775,482 | 12/1956 | Schutz | 239/498 X |
| 4,103,827 | 8/1978 | Kumazawa | 239/102 X |

Primary Examiner—Robert B. Reeves
Assistant Examiner—Gene A. Church
Attorney, Agent, or Firm—Merchant, Gould, Smith, Edell, Welter & Schmidt

[57] ABSTRACT

A fluid reflecting member for use in combination with a fluid spouting nozzle element, which member includes a cavity forming portion provided with a circular fluid reflecting cavity toward which a fluid or fluids is spouted from the fluid spouting nozzle element. The cavity forming portion is characterized by being provided with a plurality of axial slots having axially and outwardly inclining slot bottoms whereby a plurality of dispersing streams of the fluid or fluids passing through the axial slots is generated.

4 Claims, 7 Drawing Figures

FLUID REFLECTING MEMBER FOR USE IN A FLUID DISPERSING NOZZLE UNIT

FIELD OF THE INVENTION

The present invention relates generally to a mixed and automized fluid generating nozzle unit with a fluid reflecting means, and more particularly relates to an improved fluid reflecting means disposed on the donwstream side of the mixed and atomized fluid generating nozzle unit.

A fluid dispersion nozzle unit having a combination of a nozzle element and a fluid reflecting member is conventionally used for the purpose of mixing, atomizing and dispersing liquids or of generating fine buffles to be dispersed into a liquid. The mixing, atomizing and dispersing of liquids and the generating of fine buffles are achieved by utilizing the known phenomenon of a cavity resonance and the phenomenon of a fluid collision effected by a fluid spouting from the nozzle element and a fluid reflected from the fluid reflecting member.

One typical example of the conventional fluid dispersing nozzle units is disclosed in, for example, U.S. Pat. No. 4,103,827 to Kumazawa, in which unit a fluid reflecting member shaped as a cylindrical element having a fluid reflecting cavity is disposed on the downstream side of a fluid spouting nozzle element. The cylindrical fluid reflecting member has an open mouth which faces the fluid spouting opening of the nozzle element so as to receive the spouted fluids into the fluid reflecting cavity. The open mouth of the cylindrical fluid reflecting member is surrounded by a round edge. Such round edge of the known fluid reflecting member results in the fluids mixed and atomized by the fluid dispersing nozzle unit being eventually dispersed toward a fluid surrounding the unit in the form of a hollow and conical dispersion stream of the fluids. As a result, a low pressure zone is hydrodynamically generated in front of the dispersion stream of the mixed and atomized fluids. Therefore, a fluid around the low pressure zone is dragged into said zone due to a pressure difference. That is, a stream of a fluid moving toward the low pressure zone (it will hereinafter be referred to as "a drag-in stream") is generated in the surrounding fluid of the dispersing nozzle unit. However, there usually appears a fluid motionless zone, which may be referred to as "a fluid stagnant zone", between the hollow and conical dispersion stream from the nozzle unit and the above-mentioned drag-in stream. Furthermore, a part of the atomized fluids of the dispersion stream often floats in the fluid stagnant zone. Thus, the atomized fluids in the fluid stagnant zone eventually attach to the outer circumference of the fluid reflecting member adjacent to the fluid stagnant zone. Particularly, in the case where the fluid dispersing nozle unit is used as a burner nozzle for atomizing a fluid mixture including fuel oil containing therein a large amount of carbon component, and for dispersing the fluid mixture into the ambient air, the atomized fuel oil particles float in the above-mentioned fluid stagnant zone and attach to the outer circumference of the fluid reflecting member. As a result, the attached fuel oil particles become gradually dry due to an increase in the temperature of the air, so that a layer of solid carbon components is deposited on the outer circumference of the reflecting member. Consequently, while such layer of solid carbon components gradually grows, there sometimes occurs an unstable burning of the fluid mixture dispersed from the fluid dispersing nozzle unit or an extinguishing of the fire during the burning of the fluid mixture.

SUMMARY OF THE INVENTION

A primary object of the present invention is to provide a novel fluid reflecting member adapted for incorporation into a fluid dispersing nozzle unit, whereby a hydrodynamic generation of the fluid stagnant zone adjacent to the outer circumference of the member is appropriately limited.

Another object of the present invention is to provide a fluid dispersing nozzle unit which can be used as a burner nozzle for attaining a stable combustion of a liquid fuel oil irrespective of the amount of carbon components contained in the fuel oil.

According to the present invention, there is provided a fluid reflecting member of the cavity resonance type having means for collapsing a fluid stagnant zone hydrodynamically generated in the region adjacent to the outer circumference of the member. The collapsing means comprises a plurality of slots arranged in the outer circumference of the fluid reflecting member so as to axially extend from the upstream side to the downstream side of the fluid reflecting member. The slots of the fluid reflecting member enable a fluid dispersing nozzle unit, on which the reflecting member is mounted, to disperse mixed and atomized fluids at different dispersing angles with respect to the axis of the nozzle unit, so that as soon as the fluid stagnant zone is generated, it is collapsed or broken by the different dispersing stream of the fluids. The different dispersing streams of the fluids can also have a function to remove any fluid particles, such as carbon particles, from the outer circumference of the fluid reflecting member, if the fluid particles attach to or become stationary on the outer circumference of the fluid reflecting member. Therefore, the growth of a layer of any fluid particles deposited on the outer circumference of the fluid reflecting member is prevented with certainty. Furthermore, since the mixed and atomized fluids are dispersed at different dispersing angles, the mixing of the dispersed fluids with a fluid around the fluid dispersing nozzle unit can be appreciably promoted.

Further objects and advantages of the present invention will be apparent from the ensuing description of preferred embodiments with reference to the accompanying description wherein.

Figure 1A:
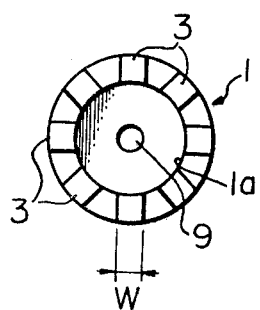
FIGS. 1A and 1B are side and cross-sectional views of a first embodiment of a fluid reflecting member according to the present invention.
Figure 1B:
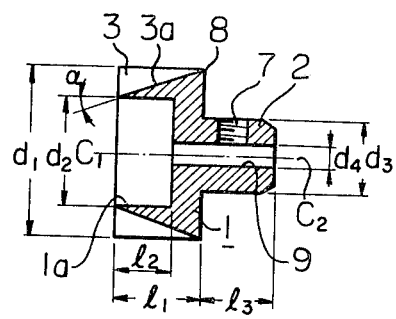
Figure 2:
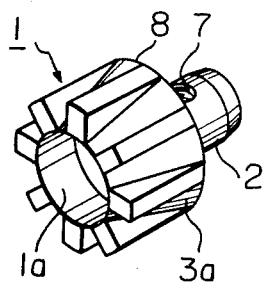
FIG. 2 is a perspective view of the fluid reflecting member of FIGS. 1A and 1B.

Referring now to FIGS. 1A, 1B and 2, a fluid reflecting member adapted to be mounted on a fluid spouting nozzle includes a cavity forming portion 1 having a cavity 1a, and a cylindrical mounting portion 2. The cavity forming portion 1 and the cylindrical mounting portion 2 are formed as one part. The cavity forming portion 1 has an outermost diameter of $d_1$ and an axial length of $l_1$. While the diameter and the depth of the cavity 1a of the cavity forming portion 1 are $d_2$ and $l_2$. Furthermore, the cavity forming portion 1 has an outer circumference thereof provided with a plurality of axial slots 3 which have a width W, respectively. The slots 3 are preferably equiangularly arranged about the central axis $C_1$-$C_2$ of the fluid reflecting member. In the case of the embodiment of FIGS. 1A, 1B and 2, eight slots 3 are formed so as to axially extend from the front side on which an open mouth of the cavity 1a is formed toward the rear side of which the cavity forming portion 1 and the cylindrical mounting portion 2 are connected together. Each of the slots 3 has an inclined bottom 3a which extends axially so as to be outwardly inclined from the front side to the rear side with respect to the central axis $C_1$-$C_2$ by an angle $\alpha$. That is to say, the front end of the inclined bottom 3a of each slot 3 intersects the cylindrical inner wall of the cavity 1a in a plane in which the open mouth of the cavity 1a is formed. The rear end of the inclined bottom 3a intersects with a rearmost edge 8 of the cavity forming portion 1. It is preferred that all of the eight slots 3 have the same inclination angle $\alpha$. However, eight slots 3 may be outwardly inclined by an angle or angles different from the inclination angle $\alpha$, so as to generate different dispersion streams of fluids, as will be understood from the later description with reference to FIG. 6. A mounting bore 9 is formed in the center of the fluid reflecting member consisting of the cavity forming portion 1 and the cylindrical mounting portion 2. The mounting bore 9 has a diameter of $d_4$. The cylindrical mounting portion 2 having an outer diameter of $d_3$ and a length of $l_3$, is formed with one or several female screw holes 7 radially intersecting the mounting bore 9.

Figure 3:
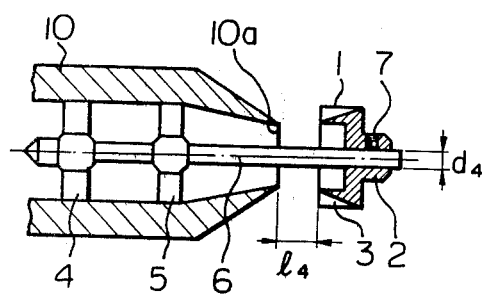
FIG. 3 is a cross-sectional view of a part of a fluid dispersing nozzle unit provided with the fluid reflecting member of FIGS. 1A, 1B and 2.

Referring to FIG. 3, the fluid reflecting member is mounted on a fluid spouting nozzle 10 having a fluid spouting opening 10a so that an assembly of a fluid dispersion nozzle unit is constituted. The mounting of the fluid reflecting member is achieved by employing a pair of supporting legs 4 and 5 and a supporting rod 6. The supporting rod 6 is centrally supported inside the fluid spouting nozzle 10 by the supporting legs 4 and 5 rigidly fixed to the inside wall of the fluid spouting nozzle 10. An outer end of the supporting rod 6 extends axially and outwardly from the fluid spouting nozzle 10, and mounts thereon the fluid reflecting member so that said member is arranged so as to be coaxial with the fluid spouting nozzle 10. Further, the fluid reflecting member is arranged so that the cavity 1a faces the outlet opening 10a of the fluid spouting nozzle 10. Fixing of the fluid reflecting member to the outer end of the supporting rod 6 is achieved by a screw or screws threadedly engaged into the female screw hole or holes 7. Furthermore, upon the fixing of the fluid reflecting member to the supporting rod 6, a distance $l_4$ between the opening 10a of the fluid spouting nozzle 10 and the open mouth of the cavity 1a of the fluid reflecting member is adjusted so that the nozzle 10 cooperates with the fluid reflecting member for the purpose of dispersing the fluids spouted from the opening 10a in desired dispersing directions and with an appropriate dispersing power. It should be noted that, in order to achieve a rigid fixing of the fluid reflecting member to the supporting rod 6, the female screw hole 7 is bored perpendicularly with respect to the axis of the mounting bore 9 into which the supporting rod 6 is inserted. A pin hole, instead of the female screw hole 7, can also be bored for rigid fixing of the fluid reflecting member by a pin press-fitted to the hole. It is preferred that the diameter $d_3$ and the length $l_3$ of the mounting portion 2 be selected so that it is as small as possible. This is because if the diameter $d_3$ and the length $l_3$ are small, the fluid surrounding the fluid reflecting member is not prevented from being dragged into the low pressure zone generated by the dispersing streams of the fluids from the fluid dispersing nozzle unit. Furthermore, it has been experimentally confirmed that the length $l_1$ of the cavity forming portion 1 should preferably be selected so that the rear end of the inclined bottom 3a of each slot 3 is exactly positioned in the rearmost edge 8 of the cavity forming portion 1, from the point of view of effectively cancelling the stagnant zone of fluids by employing the dispersion stream of the fluids having passed through the slots 3.

Figure 4:
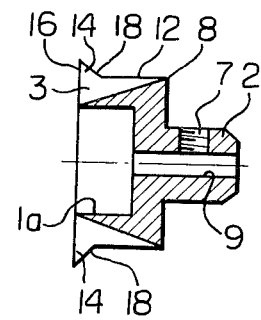
FIG. 4 is a cross-sectional view of a second embodiment of a fluid reflecting member according to the present invention.

FIG. 4, wherein like reference numerals designate parts identical or similar to those shown in FIGS. 1A and 1B, illustrates a modification of the fluid reflecting member illustrated in FIGS. 1A, 1B and 2 in which a cavity forming portion 12 of the fluid reflecting member is formed with radial projections 14 on the circumferential edge of the circular cavity 1a. The radial projections 14 respectively have a flat face 16 on the front side of the cavity forming portion 12. However, the radial projections 14 are formed with an inwardly sloping surface 18 on the back side of the flont flat surface 16, respectively. Therefore, the projections 14 cause a hydrodynamic generation of an active low pressure zone adjacent to the sloping surfaces 18 of the projections 14 when the fluid is dispersed around the fluid reflecting member. As a result, a reverse stream of the dispersed fluid is formed by the influence of the active low pressure zone. This reverse stream of the dispersed fluid is very effective for promoting the mixing of the dispersed fluid with a fluid surrounding a fluid dispersing nozzle unit. The fluid reflecting member of FIG. 4 is provided with axially extending slots 3, as provided for the fluid reflecting member of FIGS. 1A, 1B and 2. The slots 3 of the fluid reflecting member of FIG. 4 have, therefore, the same functions as the slots 3 of the fluid reflecting member of FIGS. 1A, 1B and 2.

Figure 5:
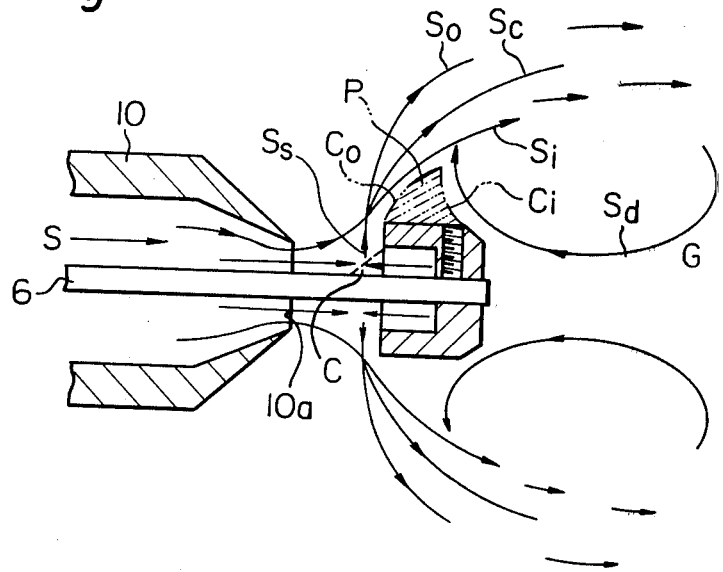
FIG. 5 is a cross-sectional view of a part of a fluid dispersing nozzle unit provided with a conventional fluid reflecting member, illustrating an operating mechanism of the conventional fluid reflecting member.

Referring to FIG. 5, which schematically illustrates a fluid dispersing nozzle unit including a fluid spouting nozzle 10 and a conventional type of fluid reflecting member, a stream of fluid S is accelerated by the nozzle 10 and the spouted at a high speed from the opening 10a toward the cavity of the fluid reflecting member. Thus, the stream of fluids is reflected from the cavity of the fluid reflecting member as a reflected jet stream. The reflected jet stream collides with the stream of fluid S subsequently spouted from the opening 10a of the nozzle 10. As a result, the colliding streams are mixed together and atomized, while forming a conical fluid colliding place C between the opening 10a and the open mouth of the cavity of the fluid reflecting member. Therefore, the mixed and atomized stream is violently disposed in the outward direction designated by Ss. This dispersing stream Ss subsequently collides with an outer part of the stream of fluid S. As a result of this collision of the two streams Ss and S a final dispersing stream Sc is generated, of which the outermost stream part is designated by So and the innermost stream part is designated by Si. The final dispersing stream Sc, dispersing at a high speed, creates a low pressure zone adjacent to the stream Sc. As a result, a fluid around the low pressure zone is hydrodynamically moved into the zone, so that some of a fluid G situated on the downstream side of the fluid reflecting member is in turn moved toward the low pressure zone as a drag-in stream Sd. At this stage, there is generated a fluid stagnant zone P between the high speed dispersing stream Sc and the drag-in stream Sd. Therefore, a part of the final dispersing stream Sc, containing therein fluid particles, enters into and flies in the fluid stagnant zone. As a result, the fluid particles will eventually attach to the outer circumference of the fluid reflecting member. Consequently, if the nozzle unit with the conventional fluid reflecting member is applied to a burner nozzle, the fluid particles consisting of fuel particles will attach to the fluid reflecting member of the burner nozzle. When the attached fuel particles are heated and dried by the flame of the burner nozzle, the fluid reflecting member will eventually be coated with a layer of carbon particles having a convex surface Co and a concave surface Ci. Therefore, while the layer of the carbon particles gradually grows, the fluid drag-in stream Sd consisting of high temperature gases is prevented from being moved into the fuel dispersing stream Sc. Accordingly, the fuel dispersing stream Sc adjacent to the fluid reflecting member cannot start to burn, and no continuous flame propagation occurs. That is to say, the growth of the layer of the carbon particles prevents continuation of a stable combustion of the fuel dispersed from the burner nozzle.

On the other hand, when the fluid reflecting member according to the present invention is employed, for example, a burner nozzle unit, any growth of the layer of the carbon particles can be eliminated.

Figure 6:
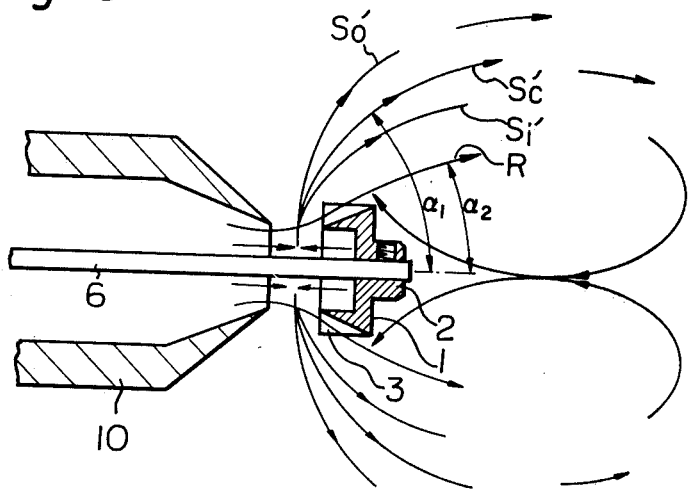
FIG. 6 is a cross-sectional view of a part of a fluid dispersing nozzle unit provided with a fluid reflecting member of the present invention, wherein an operating mechanism of the fluid reflecting member is illustrated.

The operation of the fluid reflecting member of the present invention will be hereinafter described with reference to FIG. 6, illustrating the case where the reflecting member illustrated in FIGS. 1A, 1B and 2 is employed for a burner nozzle unit. As is shown in FIG. 6, the fluid spouted from the nozzle element 10 is dispersed into the atmosphere as a first conical dispersing stream S'c having a dispersing angle $\alpha_1$ and as a second dispersing stream R having a dispersing angle $\alpha_2$. The first dispersing stream S'c resembling the dispersing stream Sc of FIG. 5 is dispersed outside the fluid reflecting member having the outermost diameter $d_1$, while the second dispersing stream R is dispersed so as to pass through the slots 3 of the fluid reflecting member. Therefore, the second dispersing stream R can break any fluid stagnant zone which may appear adjacent to the first stream S'c. As a result, there is only a slight possibility that the fuel particles will attach to the outer circumference of the fluid reflecting member, since almost all of the fuel particles approaching the outer circumference of the fluid reflecting member are carried away by the second dispersing stream R. Furthermore, if it happens that any fuel particles attach to the outer circumference of the fluid reflecting member, the second dispersing stream R can detach the fuel particles from the outer circumference of the fluid reflecting member. Thus, no growth of a layer of the fuel particles onto the fluid reflecting member occurs. In addition, since the fluid reflecting member of the present invention enables the fuel fluid spouted from the nozzle element 10 to be dispersed in more than one direction, the fuel dispersing streams can be intimately mixed with the atmospheric air and with high temperature gases. As a result, a rapid and stable combustion of the fuel fluid is promoted.

EXAMPLE

When the fluid reflecting member according to the present invention to designed and fabricated so as to have the following dementions and construction, and when the fabricated member is attached to a conventional burner nozzle for combustion of a C grade heavy oil, prevention of growth of a layer of carbon particles onto the outer circumference of the fluid reflecting member could be achieved, and a rapid and stable combustion of the heavy oil was accomplished.

$d_1 = 15.8$ milimeter
$d_2 = 10.0$ milimeter
$d_3 = 9.0$ milimeter
$l_1 = 5.0$ milimeter
$l_2 = 3.0$ milimeter
$l_3 = 5.0$ milimeter
$W = 2.2$ milimeter
$\alpha = 30$ degrees
The number of slots $3 = 8$ In conclusion, it should be understood that, when the fluid reflecting member of the present invention is used for a burner nozzle unit for dispersing and burning a heavy fuel oil containing therein a large amount of carbon components, such as a B grade heavy oil (No. 5 oil) and a C grade heavy oil (No. 6 oil), no layer of carbon particles is deposited on the outer circumference of the fluid reflecting member. As a result, a stable combustion of the heavy oil can be achieved. Also, since the fuel particles dispersed from the burner nozzle unit can be intimately mixed with the atmospheric air and high temperature burning gases, a stable and homogeneous combustion of the heavy fuel oil is accomplished. Therefore, a partial temperature rising, which causes a generation of a toxic component, such as a nitrogen oxide, does not occur.

It should further be understood that when the fluid reflecting member according to the present invention is applied to a fluid dispersion nozzle unit for dispersing a gas or gas mixture, and when the nozzle unit is placed into a some liquid, the mixture of the gas or gas mixture and the liquid can be dispersed in multi directions. Therefore, contact of the gas or gas mixture with the liquid can be promoted compared with the case of using the conventional fluid reflecting member.

What is claimed is:

1. A cavity type fluid reflecting member for use in combination with a fluid spouting nozzle element, for generating a dispersing stream of a fluid, said fluid reflecting member positioned on the axially downstream side of said fluid spouting nozzle element for cooperating therewith to define an outlet space in which fluid from said fluid spouting nozzle element collides with fluid reflected from said fluid reflecting member, wherein said cavity type fluid reflecting member is provided, at an outer circumference thereof, with a plurality of equiangularly arranged axial slots extending from the upstream side to downstream side of said fluid reflecting member, each slot having a bottom surface thereof axially extending and outwardly inclining with respect to the axis of said fluid reflecting member, wherein a part of said dispersing stream of the fluid passes through said slots and collapses a fluid stagnant zone hydrodynamically generated, in the absence of said slots, in the region adjacent to said outer circumference of said fluid reflecting member.

2. A fluid reflecting member according to claim 1, wherein said cavity forming portion of said fluid reflecting member is a substantially cylindrical element formed with said circular cavity in the center of said cylindrical element, and wherein said bottom surface of each of said axial slots extends so as to axially outwardly incline from a position adjacent to a mouth of said circular cavity to a rearmost edge of said outer circumference of said cylindrical element.

3. A fluid reflecting member according to claim 2, wherein said cylindrical element is further provided, at said one end thereof, with a flange-like projection for generating a low-pressure zone around said cylindrical element when said fluid is spouted from said fluid spouting nozzle element.

4. A fluid reflecting member according to claim 1, wherein said bottom surface of at least one of said plurality of axial slots has an inclination different from that of said bottom surface of the other of said plurality of axial slots, whereby different dispersion streams of fluid are generated and are intimately mixed with a fluid around said fluid reflecting member.

* * * * *